(12) United States Patent
Klemen et al.

(10) Patent No.: US 7,396,312 B2
(45) Date of Patent: Jul. 8, 2008

(54) SIX SPEED TRANSMISSION WITH A SINGLE CARRIER

(75) Inventors: Donald Klemen, Carmel, IN (US); Robert K. Dunlap, Greenwood, IN (US)

(73) Assignee: General Motors Corporation, Detroit, MI (US)

( * ) Notice: Subject to any disclaimer, the term of this patent is extended or adjusted under 35 U.S.C. 154(b) by 151 days.

(21) Appl. No.: 11/238,725

(22) Filed: Sep. 29, 2005

(65) Prior Publication Data
US 2007/0072734 A1    Mar. 29, 2007

(51) Int. Cl.
*F16H 3/62*    (2006.01)
(52) U.S. Cl. ...................... 475/275; 475/276
(58) Field of Classification Search ......... 475/275–279, 475/282, 284, 286, 290, 313, 323, 325
See application file for complete search history.

(56) References Cited

U.S. PATENT DOCUMENTS

| | | | | |
|---|---|---|---|---|
| 3,137,182 A * | 6/1964 | Berchtold et al. | ............. | 475/22 |
| 3,287,995 A * | 11/1966 | Leonard et al. | ............... | 477/53 |
| 4,070,927 A | 1/1978 | Polak | ......................... | 475/286 |
| 4,345,490 A * | 8/1982 | Madson | ...................... | 475/277 |
| 4,485,691 A * | 12/1984 | Reed | ............................ | 475/24 |
| 4,709,594 A | 12/1987 | Maeda | ........................ | 475/280 |
| 4,799,401 A * | 1/1989 | Reed | ............................ | 475/24 |
| 5,106,352 A | 4/1992 | Lepelletier | .................. | 475/280 |
| 5,385,064 A | 1/1995 | Reece | ........................ | 74/331 |
| 5,497,867 A | 3/1996 | Hirsch et al. | ............. | 192/48.91 |
| 5,560,461 A | 10/1996 | Loeffler | .................... | 192/53.32 |
| 5,599,251 A | 2/1997 | Beim et al. | ................. | 475/275 |
| 5,641,045 A | 6/1997 | Ogawa et al. | .......... | 192/53.341 |
| 5,651,435 A | 7/1997 | Perosky et al. | ............. | 192/219 |
| 5,975,263 A | 11/1999 | Forsyth | .................... | 192/53.32 |
| 6,053,839 A | 4/2000 | Baldwin et al. | ............. | 475/281 |
| 6,071,208 A | 6/2000 | Koivunen | .................... | 475/275 |
| 6,083,135 A | 7/2000 | Baldwin et al. | ............. | 475/276 |
| 6,217,474 B1 | 4/2001 | Ross et al. | .................... | 475/269 |
| 6,354,416 B1 | 3/2002 | Eo | ........................... | 192/53.341 |
| 6,375,592 B1 | 4/2002 | Takahashi et al. | ........... | 475/262 |
| 6,422,969 B1 | 7/2002 | Raghavan et al. | ........... | 475/276 |
| 6,425,841 B1 | 7/2002 | Haka | .......................... | 475/275 |
| 6,471,615 B1 | 10/2002 | Naraki et al. | ............... | 475/262 |
| 6,558,287 B2 | 5/2003 | Hayabuchi et al. | .......... | 475/271 |
| 6,561,938 B1 * | 5/2003 | Korner et al. | ................. | 475/59 |
| 6,585,620 B1 * | 7/2003 | Bae | ............................. | 475/331 |
| 6,623,397 B1 | 9/2003 | Raghavan et al. | .......... | 360/96.5 |
| 6,634,980 B1 * | 10/2003 | Ziemer | ........................ | 475/275 |
| 6,669,597 B1 * | 12/2003 | Usoro et al. | ................. | 475/323 |
| 7,282,007 B2 * | 10/2007 | Ishimaru | ..................... | 475/275 |

FOREIGN PATENT DOCUMENTS

JP         09-126283         5/1997

* cited by examiner

*Primary Examiner*—Sherry Estremsky

(57) ABSTRACT

A six speed transmission is provided that includes three planetary gear sets having a common carrier member and six torque-transmitting mechanisms operated in combinations of two to provide at least six forward speed ratios and two reverse speed ratios. A method of assembling a transmission is also provided. A reduction in components and component standardization is achieved.

16 Claims, 1 Drawing Sheet

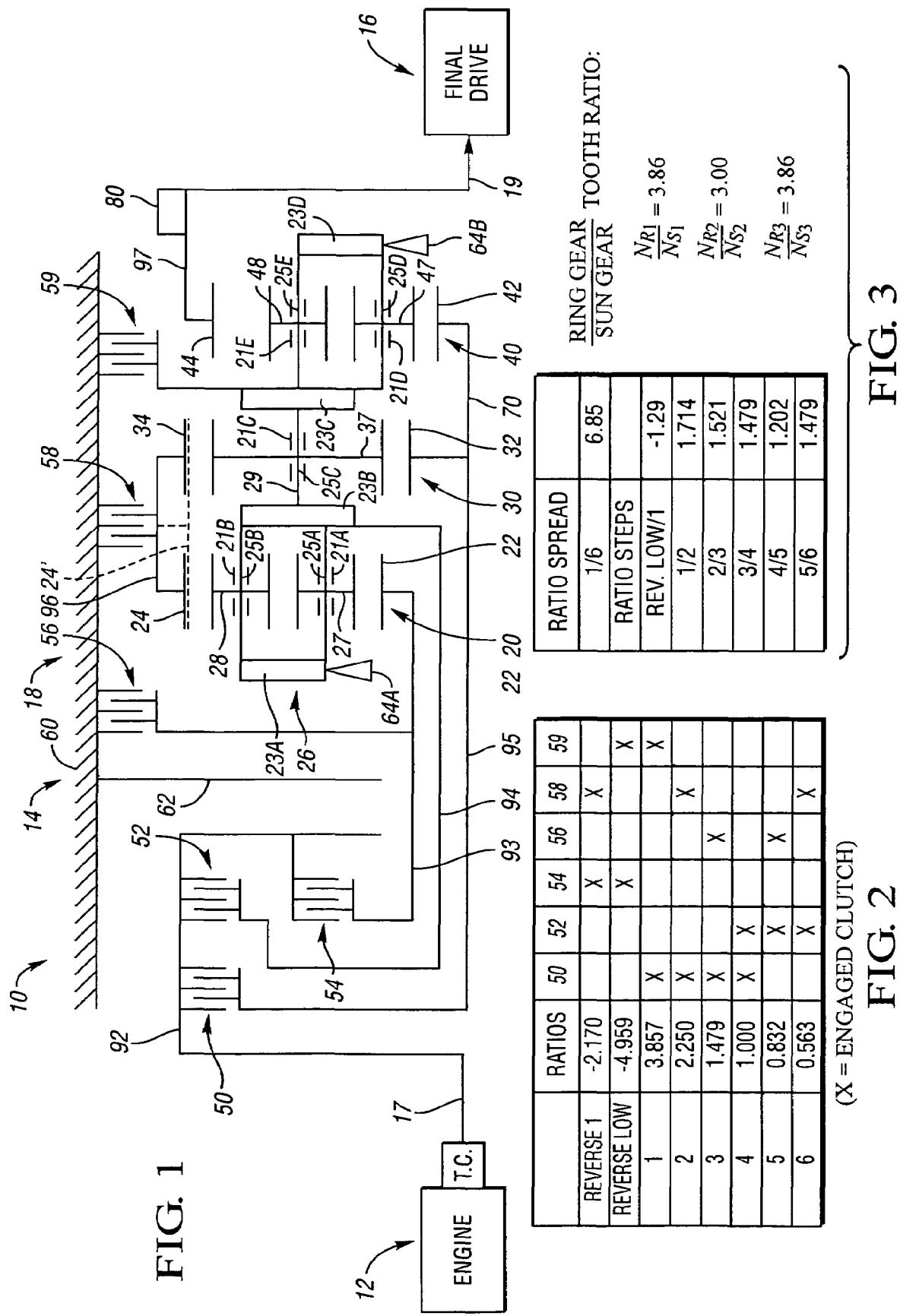

SIX SPEED TRANSMISSION WITH A SINGLE CARRIER

TECHNICAL FIELD

The present invention relates to power transmissions having three planetary gear sets with a single, common carrier member. More specifically, the gear sets are controlled by six torque-transmitting mechanisms to provide six forward speed ratios and two reverse speed ratios.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

SUMMARY OF THE INVENTION

A multi-speed transmission is provided having a single, common carrier member functioning for each of multiple planetary gear sets. The single carrier member allows for reduction in components and a potentially lower transmission cost.

Accordingly, a multi-speed transmission includes an input shaft and an output shaft. First, second and third planetary gear sets have a common carrier member, at least two ring gear members, and each has a sun gear member. A plurality of sets of pinion gears is rotatably mounted on the common carrier member for intermeshing with the ring gear members and the sun gear members. The input shaft is not continuously connected with any member of the planetary gear sets and the output shaft is continuously connected with a member of the planetary gear sets. Six torque-transmitting mechanisms are operable for selectively interconnecting members of the planetary gear sets with the input shaft, with a stationary member, or with other members of the planetary gear sets. The six torque-transmitting mechanisms are engaged in combinations of two to establish at least six forward speed ratios and two reverse speed ratios between the input shaft and the output shaft.

In one aspect of the invention, an interconnecting member continuously interconnects the sun gear member of one of the planetary gear sets with the sun gear member of another of the planetary gear sets.

In another aspect of the invention, one of the ring gear members intermeshes with pinion gears of both the first and second planetary gear sets.

In yet another aspect of the invention, each pinion gear is characterized by a predetermined number of teeth and rotates on a respective spindle mounted on the common carrier member at a respective bearing. Each of the spindles is of the same size and each of the bearings is of the same size.

The first and second planetary gear sets may have separate ring gear members or share a common ring gear member. If separate ring gear members are used for the first and second planetary gear sets, an interconnecting member interconnects the ring gear member of the first planetary gear set with the ring gear member of the second planetary gear set.

In yet another aspect of the invention, a first of the six torque-transmitting mechanisms is operable for selectively interconnecting the sun gear member of the second planetary gear set and the sun gear member of the third planetary gear set with the input shaft.

In still another aspect of the invention, a second of the six torque-transmitting mechanisms is operable for selectively interconnecting the common carrier member with the input shaft.

In another aspect of the invention, a third of the six torque-transmitting mechanisms is operable for selectively interconnecting the input shaft with the sun gear member of the first planetary gear set. Preferably the third torque-transmitting mechanism is disposed radially inward of the first and second torque-transmitting mechanisms, as the third torque-transmitting mechanism is characterized by higher speeds than the first and second torque-transmitting mechanisms. The radially inward position of the third torque-transmitting mechanism thereby minimizes spin losses.

In still another aspect of the invention, a fourth of the six torque-transmitting mechanisms is operable for selectively interconnecting the sun gear member of the first planetary gear set with the stationary member.

In still further aspect of the invention, a fifth of the six torque-transmitting mechanisms is operable for selectively interconnecting a ring gear member of the first and second planetary gear sets with the stationary member.

In another aspect of the invention, a sixth of the six torque-transmitting mechanisms is operable for selectively interconnecting the common carrier member with the stationary member.

A method of assembling a transmission having multiple planetary gear sets includes providing a single carrier member configured to rotatably support pinion gears for each of the planetary gear sets. The method also includes radially positioning the single carrier member within the transmission on two axially spaced bushings. Thus, the use of the single carrier member enables relatively simple and accurate positioning during assembly.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic representation of a powertrain including an embodiment of a planetary transmission of the present invention with an alternative single ring gear member shown in phantom;

FIG. 2 is a truth table depicting some of the operating characteristics of the powertrain shown in FIG. 1; and FIG. 3 is a chart depicting other operating characteristics of the powertrain shown in FIG. 1.

DESCRIPTION OF THE PREFERRED EMBODIMENTS

Referring to the drawings, wherein like reference numerals represent the same or corresponding parts through the several views, there is shown in FIG. 1 a powertrain 10 having a conventional engine and torque converter 12, a planetary transmission 14 and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly member 26. The planet carrier assembly member 26 includes a plurality of pinion gears 27 (a first set of pinion gears) rotatably mounted on a carrier member 29 and disposed in meshing relationship with the sun gear member 22. A plurality of pinion gears 28 (a second set of pinion gears) is also rotatably mounted on the carrier member 29. The pinion gears 28 are disposed in meshing relationship with the pinion gears 27 and the ring gear member 24.

The planetary gear set 30 includes a sun gear member 32, a ring gear member 34, and the same planet carrier assembly member 26. The planet carrier assembly member 26 includes a plurality of pinion gears 37 rotatably mounted on the same carrier member 29 and disposed in meshing relationship with both the sun gear member 32 and the ring gear member 34. Pinion gears 37 are also referred to herein as a third set of pinion gears.

In an alternative embodiment, rather than separate ring gear members 24 and 34, a single ring gear member 24' is included in both the planetary gear sets 20 and 30. The single ring gear member 24' is in meshing relationship with both the pinion gears 28 and the pinion gears 37.

The planetary gear set 40 includes a sun gear member 42, a ring gear member 44, and the same planet carrier assembly member 26. The planet carrier assembly member 26 includes a plurality of pinion gears 47 (a fourth set of pinion gears) rotatably mounted on the same carrier member 29 and disposed in meshing relationship with the sun gear member 42. A plurality of pinion gears 48 (a fifth set of pinion gears) is also rotatably mounted on the carrier member 29 and is disposed in meshing relationship with both the ring gear member 44 and the pinion gears 47.

Each pinion gear 27, 28, 37, 47, and 48 rotates on a spindle mounted on the common carrier member 29 at a respective bearing. For instance, pinion gear 27 rotates on a spindle 25A mounted on carrier member 29 at bearing 21A. Pinion gear 28 rotates on a spindle 25B mounted on carrier member 29 at bearing 21B. Pinion gear 37 rotates on spindle 25C mounted on carrier member 29 at bearing 21C. Pinion gear 47 rotates on spindle 25D mounted on carrier member 29 at bearing 21D. Pinion gear 48 rotates on spindle 25E mounted on common carrier member 29 at bearing 21E.

The use of the common carrier member 29 reduces the number of required housing walls, saving axial space and reducing the number of thrust washers required. For instance, thrust washers (not shown) may be positioned adjacent end housing walls 23A and 23D to absorb axial thrust. However, no thrust washers are required between gear sets 20 and 30 or between gear sets 30 and 40, as shared housing walls 23B, 23C, respectively, are employed.

The input shaft 17 is not continuously connected with any member of the planetary gear sets 20, 30 and 40. The output shaft 19 is continuously connected with the ring gear member 44 via a drum 97. A park lock gear 80 is also disposed on the drum 97 such that it is continuously interconnected with the ring gear member 44 and the output member 19. The sun gear member 32 is continuously connected with the sun gear member 42 via an interconnecting member 70. The ring gear member 24 is continuously connected with the ring gear member 34 via a drum 96. Those skilled in the art will readily understand that a consolidation of parts is realized by utilizing an alternative embodiment having a single ring gear member 24' in lieu of the separate ring gear members 24 and 34.

The input shaft 17 is selectively connectable with the sun gear member 32 via torque-transmitting mechanism 50 which may be referred to herein as the C1 clutch. Selective engagement of the C1 clutch connects a drum 92 which is continuously connected with the input member 17 to an inner shaft 95 which is continuously connected with the sun gear member 32. The input shaft 17 is also selectively connectable with the common carrier member 29 via a torque-transmitting mechanism 52, which may also be referred to herein as the C2 clutch. The C2 clutch 52 selectively interconnects the drum 92 with an intermediate shaft 94 that is continuously connected with the carrier member 29. Additionally, the input shaft 17 is also selectively connectable with the sun gear member 22 via a torque-transmitting mechanism 54, which may also be referred to herein as C3 clutch 54. The C3 clutch 54 selectively interconnects the drum 92 with an outer shaft 93 that is continuously connected with the sun gear member 22. Torque-transmitting mechanism 56 which may also be referred to herein as the C4 clutch 56, selectively connects the sun gear member 22 with the transmission housing 60, which may also be referred to herein as a stationary member. An extension or wall 62 of the transmission housing 60 extends between the drum 92 and the C4 clutch 56. The wall 62 provides support and oil feed for the clutches 50, 52 and 54. A torque-transmitting mechanism 58, which may also be referred to herein as the C5 clutch, selectively connects the drum 96 with the transmission housing 60, thereby grounding the ring gear members 24 and 34 with the transmission housing 60. If the alternative single ring gear member 24' is used, the C5 clutch 58 selectively interconnects the ring gear member 24' with the transmission housing 60. A torque-transmitting mechanism 59 selectively connects the common carrier member 29 with the transmission housing 60. The torque-transmitting mechanism 59 may also be referred to herein as the C6 clutch.

The Reverse 1 speed ratio is established with the engagement of the C3 clutch 54 and the C5 clutch 58. The C3 clutch 54 connects the input member 17 with the sun gear member 22, and the C5 clutch 58 connects the ring gear member 24 and the ring gear member 34 with the transmission housing 60. The sun gear member 22 rotates at the same speed as the input shaft 17. The ring gear member 24 and the ring gear member 34 do not rotate. If the alternative embodiment having the single ring gear member 24' is utilized, the ring gear member 24' does not rotate. The common carrier member 29 rotates as a speed determined from the speed of the sun gear member 22 and the ring gear/sun gear tooth ratio of the planetary gear set 20. The sun gear member 32 rotates at the same speed as the sun gear member 42. The sun gear member 32 rotates at a speed determined from the speed of the common carrier member 29 and the ring gear/sun gear tooth ratio of the planetary gear set 30. The ring gear member 44 rotates at the same speed as the output shaft 19. The ring gear member 44, and therefore the output shaft 19, rotates at a speed determined from the speed of the common carrier member 29, the speed of the sun gear member 42, and the ring gear/sun gear tooth ratio of the planetary gear set 40. The numerical value of the Reverse 1 speed ratio is determined utilizing the ring gear/sun gear tooth ratios of the planetary gear sets 20, 30 and 40.

The Reverse Low speed ratio is established with the engagement of the C3 clutch 54 and the C6 clutch 59. The C3 clutch 54 connects the input shaft 17 with the sun gear member 22, and the C6 clutch 59 connects the common carrier member 29 with the transmission housing 60. The sun gear member 22 rotates at the same speed as the input shaft 17. The common carrier member 29 does not rotate. The ring gear member 24 rotates at the same speed as the ring gear member 34. The ring gear member 24 rotates at a speed determined from the speed of the sun gear member 22 and the ring gear/sun gear tooth ratio of the planetary gear set 20. The sun gear member 32 rotates at the same speed as the sun gear member 42. The sun gear member 32 rotates at a speed determined from the speed of the ring gear member 34 and the ring gear/sun gear tooth ratio of the planetary gear set 30. If the alternative single ring gear member 24' is used in lieu of ring gear members 24 and 34, then the speed of the single ring gear member 24' is determined utilizing the speed of the sun gear member 22 and the ring gear/sun gear tooth ratio of the planetary gear set 20. Additionally, the sun gear member 32 would then rotate at a speed determined from the speed of the single ring gear member 24' and the ring gear/sun gear tooth ratio of the planetary gear set 30. The ring gear member 44 rotates at the same speed as the output shaft 19. The ring gear member 44 rotates at a speed determined from the speed of the sun gear member 42 and the ring gear/sun gear tooth ratio of the planetary gear set 40. The numerical value of the Reverse Low speed ratio is determined utilizing the ring gear/sun gear tooth ratios of the planetary gear sets 20, 30 and 40.

The first forward speed ratio is established with the engagement of the C1 clutch 50 and the C6 clutch 59. The C1 clutch 50 connects the input shaft 17 with the sun gear member 32, and the C6 clutch 59 connects the common carrier member 29 with the transmission housing 60. The sun gear member 32 and the sun gear member 42 rotate at the same speed as the input shaft 17. The common carrier member 29 does not rotate. The ring gear member 44 rotates at the same speed as the output shaft 19. The ring gear member 44, and therefore the output shaft 19, rotates at a speed determined from the speed of the sun gear member 42 and the ring gear/sun gear tooth ratio of the planetary gear set 40. The numerical value of the first forward speed ratio is determined utilizing the ring gear/sun gear tooth ratio of the planetary gear set 40.

The second forward speed ratio is established with the engagement of the C1 clutch 50 and the C5 clutch 58. The C1 clutch 50 connects the input shaft 17 with the sun gear member 32, and the C5 clutch 58 connects the ring gear member 24 (or the single ring gear member 24' in the event that the alternative embodiment is used) with the transmission housing 60. The sun gear member 32 and the sun gear member 42 rotate at the same speed as the input shaft 17. The ring gear member 24 and the ring gear member 34 (or in the case of the alternative embodiment, the single ring gear member 24') do not rotate. The common carrier member 29 rotates at a speed determined from the speed of the sun gear member 32 and the ring gear/sun gear tooth ratio of the planetary gear set 30. The ring gear member 44 rotates at the same speed as the output shaft 19. The ring gear member 44, and therefore the output shaft 19, rotates at a speed determined from the speed of the common carrier member 29, the speed of the sun gear member 42 and the ring gear/sun gear tooth ratio of the planetary gear set 40. The numerical value of the second forward speed ratio is determined the ring gear/sun gear tooth ratios of the planetary gear sets 30 and 40.

The third forward speed ratio is established with the engagement of the C1 clutch 50 and the C4 clutch 56. The C1 clutch 50 connects the input shaft 17 with the sun gear member 32, and the C4 clutch 56 connects the sun gear member 22 with the transmission housing 60. The sun gear member 32 and the sun gear member 42 rotate at the same speed as the input shaft 17. The sun gear member 22 does not rotate. The ring gear member 24 rotates at the same speed as the ring gear member 34. The ring gear member 24 (or the single ring gear member 24' in case the alternative embodiment is utilized) rotates at a speed determined from the speed of the common carrier member 29 and the ring gear/sun gear tooth ratio of the planetary gear set 20. The ring gear member 34 (or, in the event that the alternative embodiment is utilized, the single ring gear member 24'), rotates at a speed determined from the speed of common carrier member 29, the speed of the sun gear member 32 and the ring gear/sun gear tooth ratio of the planetary gear set 30. The ring gear member 44 rotates at the same speed as the output shaft 19. The ring gear member 44, and therefore the output shaft 19, rotates at a speed determined from the speed of the common carrier member 29, the speed of the sun gear member 42 and the ring gear/sun gear tooth ratio of the planetary gear set 40. The numerical value of the third forward speed ratio is determined utilizing the ring gear/sun gear tooth ratios of the planetary gear sets 20, 30 and 40.

The fourth forward speed ratio is established with the engagement of the C1 clutch 50 and the C2 clutch 52. The C1 clutch 50 connects the sun gear member 32 with the input shaft 17, and the C2 clutch 52 connects the common carrier member 29 with the input shaft 17. In this arrangement, all the members of the gear sets 20, 30 and 40 rotate at the same speed as the input shaft 17. Thus the output shaft 19 rotates at the same speed as the input shaft 17 in a direct drive relationship.

The fifth forward speed ratio is established with the engagement of the C2 clutch 52 and the C4 clutch 56. The C2 clutch 52 connects the input shaft 17 with the common carrier member 29, and the C4 clutch 56 connects the sun gear member 22 with the transmission housing 60. The common carrier member 29 rotates at the same speed as the input shaft 17. The ring gear member 24 rotates at the same speed as the ring gear member 34. The sun gear member 22 does not rotate. The ring gear member 24 (or the single ring gear member 24' in the event that the alternative embodiment is utilized) rotates at a speed determined from the speed of the common carrier member 29 and the ring gear/sun gear tooth ratio of the planetary gear set 20. The sun gear member 32 rotates at the same speed as the sun gear member 42. The sun gear member 32 rotates at a speed determined from the speed of the ring gear member 34, the speed of the common carrier member 29 and the ring gear/sun gear tooth ratio of the planetary gear set 30. The ring gear member 44 rotates at the same speed as the output shaft 19. The ring gear member 44, and therefore the output shaft 19, rotates at a speed determined from the speed of the common carrier member 29, the speed of the sun gear member 42 and the ring gear/sun gear tooth ratio of the planetary gear set 40. The numerical value of the fifth forward speed ratio is determined utilizing the ring gear/sun gear tooth ratios of the planetary gear sets 20, 30 and 40.

The sixth forward speed ratio is established with the engagement of the C2 clutch 52 and the C5 clutch 58. The C2 clutch 52 connects the input shaft 17 with the common carrier member 29, and the C5 clutch 58 connects the ring gear member 24 with the transmission housing 60. The common carrier member 29 rotates at the same speed as the input shaft 17. The sun gear member 32 rotates at the same speed as the sun gear member 42. The ring gear members 24 and 34 (or the alternative single ring gear member 24') do not rotate. The sun gear member 32 rotates at a speed determined from the speed of the common carrier member 29 and the ring gear/sun gear tooth ratio of the planetary gear set 30. The ring gear member 44 rotates at the same speed as the output shaft 19. The ring gear member, and therefore the output shaft 19, rotates at a speed determined from the speed of the common carrier member 29, the speed of the sun gear member 42 and the ring gear/sun gear tooth ratio of the planetary gear set 40. The numerical value of the sixth forward speed ratio is determined utilizing the ring gear/sun gear tooth ratios of the planetary gear sets 30 and 40.

As set forth above, the engagement schedules for the torque-transmitting mechanisms is shown in the truth table of FIG. 2. This truth table also provides an example of speed ratios that are available utilizing the ring gear/sun gear tooth ratios given by way of example as follows $N_{R1}/S_{R1}=3.86$ and $N_{R2}/S_{R2}=3.00$ and $N_{R3}/S_{R3}=3.86$. $N_{R1}/S_{R1}$ is the tooth ratio of planetary gear set 20; $N_{R2}/S_{R2}$ is the tooth ratio of the planetary gear set 30; and $N_{R3}/S_{R3}$ value is the tooth ratio of the planetary gear set 40. It should be noted that single and double step ratio interchanges are of the single transmission variety.

The chart of FIG. 3 describes the speed ratios and ratio steps that are obtained by the transmission of FIG. 1 utilizing the same tooth ratios given above. For example, the step ratio between the first and second forward speed ratios is 1.714, while the step ratio between the Reverse Low and the first forward speed ratio is −1.29. A relatively wide ratio of 6.85 is obtained between the first and sixth forward speed ratios.

Shafting requirements for the transmission 14 are minimized by: (i) interconnecting the sun gear members 32 and 42 with the drum 92 and therefore the input shaft 17 via the inner shaft 95, (ii) by selectively interconnecting the common carrier member 29 with the drum 92 and therefore the input shaft 17 via an intermediate shaft 94 when the C2 clutch 52 is engaged, (iii) selectively interconnecting the sun gear member 22 with the input shaft 17 via the outer shaft 93 when the C3 clutch 54 is engaged, and (iv) by creating the shafts 93, 94, 95 such that they are coaxially disposed. This allows for a compact arrangement. The C3 clutch 54 is positioned radially inward of the C1 clutch 50 and the C2 clutch 52. Because the C3 clutch 54 rotates at higher speeds than the C1 clutch 50 and the C2 clutch 52, spin losses are minimized by minimizing the radially displacement of the C3 clutch 54 from a center axis of rotation (e.g., an axis defined by the input shaft 17 and the output shaft 19).

In the preferred embodiment, each of the pinion gears has a common number of teeth. For instance, in the transmission 14 of FIG. 1, the pinion gears 27, 28, 37, 47 and 48 may all have 27 teeth while sun gear member 22 has 21 teeth, sun gear member 32 has 27 teeth, sun gear member 42 has 21 teeth, ring gear member 24 and ring gear member 34 (or the alternative single ring gear member 24') have 81 teeth and ring gear member 44 has 81 teeth. By providing pinion gears with a common number of teeth (i.e., having a predetermined size), bearings 21A-21E may have a common bearing size and spindles 25A-25E may be of a common size as well.

By utilizing a single common carrier member 29, assembly time may be reduced as only one carrier member needs to be positioned within the transmission 14 rather than three separate members. The common carrier member 29 maybe located radially with precision on bushings 64A and 64B. The bushings 64A and 64B support inner radial portions of the common carrier assembly member 26 at a specifically designed radial and axial position. Accordingly, a method of assembling a transmission having multiple planetary gear sets includes providing a single carrier member 29 configured to rotatably support pinion gears 27, 28, 37, 47 and 48 for each of the planetary gear sets 20, 30 and 40. The method further includes radially positioning the single carrier member within the transmission 14 on two axially spaced bushing 64A, 64B.

It is noted that the ratio coverage between the first and sixth forward speed ratios is 6.85 to 1 which provides a relatively high useable ratio coverage. The ratio of the forward and reverse speeds may be adjusted to provide nearly equal forward and reverse ratios. Other ratio coverages may be achieved with different gear tooth counts. For instance, low gear coverage may be reduced while the amount of overdrive may be increased. A low gear first forward speed ratio of 3.222 to a sixth forward speed ratio of 0.5 provides a total usable ratio coverage of 6.44 to 1. The final selection of ratio. coverage is based on cost, assembly and application guidelines.

The transmission 14 of FIG. 1 provides pinion speeds, carrier speeds and clutch slip speeds compatible with very high engine input speeds, typical of smaller displacement, variable cam engines. With the selected tooth ratios discussed above, the C3 clutch 54 will be characterized by speeds higher than those of the C1 clutch 50 and the C2 clutch 52. Speed and torque calculations which will be readily understood by those skilled in the art (and which may be calculated based on gear tooth numbers) reveal that the transmission 14 provides very good torque sharing as the ratio steps progress, which improves durability of the transmission 14. Additionally, those skilled in the art will readily understand that the transmission 14 is void of any internal power loops which enables a very high mechanical efficiency.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input shaft;
an output shaft;
first, second and third planetary gear sets having a common carrier member, at least two ring gear members, and each having a sun gear member;
a plurality of sets of pinion gears rotatably mounted on said common carrier member intermeshing with said ring gear members and said sun gear members;

said input shaft not being continuously connected with any member of said planetary gear sets and said output shaft being continuously connected with a member of said planetary gear sets; and six torque-transmitting mechanisms operable for selectively interconnecting said members of said planetary gear sets with said input shaft, with a stationary member or with other members of said planetary gear sets, said six torque-transmitting mechanisms being engaged in combinations of two to establish at least six forward speed ratios and two reverse speed ratios between said input shaft and said output shaft.

2. The multi-speed transmission of claim 1, further comprising:

an interconnecting member continuously interconnecting said sun gear member of one of said planetary gear sets with said sun gear member of another of said planetary gear sets.

3. The multi-speed transmission of claim 1, wherein one of said ring gear members intermeshes with both a first set and a second set of said plurality of sets of pinion gears, said first set being members of said first planetary gear set and said second set being members of said second planetary gear set.

4. The multi-speed transmission of claim 1, wherein each pinion gear of said plurality of sets of pinion gears is characterized by a predetermined number of teeth and rotates on a respective spindle mounted on said common carrier member at a respective bearing, each of said respective spindles and said respective bearings being characterized by a predetermined spindle size and each of said respective bearings being characterized by a predetermined bearing size.

5. The multi-speed transmission of claim 1, wherein a first of said six torque-transmitting mechanisms is operable for selectively interconnecting said sun gear member of said second planetary gear set and said sun gear member of said third planetary gear set with said input shaft.

6. The multi-speed transmission of claim 1, wherein a second of said six torque-transmitting mechanisms is operable for selectively interconnecting said common carrier member with said input shaft.

7. The multi-speed transmission of claim 1, wherein a third of said six torque-transmitting mechanisms is operable for selectively interconnecting said input shaft with said sun gear member of said first planetary gear set.

8. The multi-speed transmission of claim 1, wherein a fourth of said six torque-transmitting mechanisms is operable for selectively interconnecting said sun gear member of said first planetary gear set with said stationary member.

9. The multi-speed transmission of claim 1, wherein a first of said at least two ring gear members is a member of said first and second planetary gear sets; and wherein a fifth of said torque-transmitting mechanisms is operable for selectively interconnecting said first of said at least two ring gear members with said stationary member.

10. The multi-speed transmission of claim 1, wherein a second of said at least two ring gear members is a member of said third planetary gear set; and wherein a sixth of said six torque-transmitting mechanisms is operable for selectively interconnecting said common carrier member with said stationary member.

11. A multi-speed transmission comprising:
an input shaft;
an output shaft;
first, second and third planetary gear sets having a common carrier member, each having a sun gear member, said first and second planetary gear sets having at least one ring gear member and said third planetary gear set having another ring gear member, said sun gear member of said second planetary gear set being continuously connected with said sun gear member of said third planetary gear set;

said input shaft not being continuously connected with any member of said planetary gear sets and said output shaft being continuously connected with said ring gear member of said third planetary gear set;

a first torque-transmitting mechanism operable for selectively interconnecting said sun gear member of said second planetary gear set with said input shaft;

a second torque-transmitting mechanism operable for selectively interconnecting said common carrier member with said input shaft;

a third torque-transmitting mechanism operable for selectively interconnecting said sun gear member of said first planetary gear set with said input shaft;

a fourth torque-transmitting mechanism operable for selectively interconnecting said sun gear member of said first planetary gear set with said stationary member;

a fifth torque-transmitting mechanism operable for selectively interconnecting said at least one ring gear member of said first and second planetary gear sets with said stationary member;

a sixth torque-transmitting mechanism for selectively interconnecting said common carrier member with said stationary member; and said six torque-transmitting mechanisms being operable in combinations of two to provide six forward speed ratios and two reverse speed ratios.

12. The multi-speed transmission of claim 11, wherein said at least one ring gear member of said first and second planetary gear sets is a single ring gear member interconnecting both with pinion gears of said first planetary gear set and pinion gears of said second planetary gear set.

13. The multi-speed transmission of claim 11, wherein said at least one ring gear member includes a first ring gear member of said first planetary gear set and a second ring gear member of said second planetary gear set, said transmission further comprising:

an interconnecting member continuously interconnecting said first ring gear member of said first planetary gear set with said second ring gear member of said second planetary gear set.

14. The multi-speed transmission of claim 11, further comprising:

five sets of pinion gears rotatably mounted on said common carrier member;

a first and a second of said five sets of pinion gears intermeshing with said at least on ring gear member of said first and second planetary gear sets and with said sun gear member of said first planetary gear set, respectively, and with one another;

a third of said five sets of pinion gears intermeshing both with said at least one ring gear member of said first and second planetary gear sets and said sun gear member of said second planetary gear set; and a fourth and a fifth of said five sets of pinion gears intermeshing both with said ring gear member of said third planetary gear set and said sun gear member of said third planetary gear set, respectively, and with one another.

15. The multi-speed transmission of claim 11, further comprising:

a park lock gear continuously interconnected with said ring gear member of said third planetary gear set and with said output member.

16. The multi-speed transmission of claim 11, wherein said third torque-transmitting mechanism is disposed radially inward of said first and second torque-transmitting mechanisms, wherein said third torque-transmitting mechanism is characterized by higher speeds than said first and second torque-transmitting mechanisms, said radially inward disposition of said third torque-transmitting mechanism thereby minimizing spin losses.

* * * * *